(12) United States Patent
Sako

(10) Patent No.: US 11,954,381 B2
(45) Date of Patent: Apr. 9, 2024

(54) SYSTEM INCLUDES SERVER, PRINTING APPARATUS, INFORMATION PROCESSING APPARATUS TO PROVIDE A TECHNIQUE FOR SPECIFYING A PHYSICAL PRINTER ASSOCIATED WITH A LOGICAL PRINTER, AND NON-TRANSITORY STORAGE MEDIUM

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/320,342

(22) Filed: May 19, 2023

(65) Prior Publication Data
US 2023/0409256 A1 Dec. 21, 2023

(30) Foreign Application Priority Data

Jun. 15, 2022 (JP) .................................. 2022-096757

(51) Int. Cl.
| | |
|---|---|
| *G06F 3/12* | (2006.01) |
| *G06F 21/34* | (2013.01) |
| *G06F 21/60* | (2013.01) |
| *H04L 9/40* | (2022.01) |
| *H04W 12/069* | (2021.01) |

(52) U.S. Cl.
CPC .......... *G06F 3/1222* (2013.01); *G06F 3/1236* (2013.01); *G06F 3/1238* (2013.01); *G06F 3/1286* (2013.01); *G06F 3/1287* (2013.01); *G06F 21/34* (2013.01); *G06F 21/606* (2013.01); *H04L 63/0853* (2013.01); *H04W 12/069* (2021.01)

(58) Field of Classification Search
None
See application file for complete search history.

(56) References Cited

U.S. PATENT DOCUMENTS

| | | | |
|---|---|---|---|
| 11,632,484 B2 * | 4/2023 | Ishida ..................... | G06F 21/31 358/1.14 |
| 2004/0184064 A1 * | 9/2004 | TaKeda ................. | G06F 21/608 358/1.14 |
| 2011/0157643 A1 * | 6/2011 | Shozaki ............. | H04N 1/00244 358/1.15 |

(Continued)

FOREIGN PATENT DOCUMENTS

JP 2022040993 A 3/2022

*Primary Examiner* — Haris Sabah
(74) *Attorney, Agent, or Firm* — ROSSI, KIMMS & McDOWELL LLP

(57) ABSTRACT

A printing apparatus includes a first receiving unit configured to receive a first print job from a print server, a second receiving unit configured to receive a second print job from an information processing apparatus within a local area network, a print unit configured to perform printing that is based on the first print job and printing that is based on the second print job, a storage unit configured to store a private key and a digital certificate, and a transmission unit configured to transmit the digital certificate to the information processing apparatus within the local area network. The digital certificate includes a public key paired with the private key, and an electronic signature created by the print server.

11 Claims, 14 Drawing Sheets

(56) References Cited

U.S. PATENT DOCUMENTS

2018/0136884 A1* 5/2018 Ikari ................. G06F 3/1285
2020/0089446 A1* 3/2020 Shiotani ............. G06F 3/1209
2022/0066705 A1 3/2022 Kuroda

* cited by examiner

| | PRINTER NAME | PRINTER ATTRIBUTE | CLOUD PRINTER ID | DIGITAL CERTIFICATE | LOCAL PRINTER ID |
|---|---|---|---|---|---|
| 1211 | PRINTER A | ATTRIBUTE A | c7565f07... | DIGITAL CERTIFICATE A | — |
| 1212 | PRINTER B | ATTRIBUTE B | — | DIGITAL CERTIFICATE B | 2345cba4... |
| 1213 | PRINTER C | ATTRIBUTE C | 79806d24... | DIGITAL CERTIFICATE C | 1783fda3... |

SYSTEM INCLUDES SERVER, PRINTING APPARATUS, INFORMATION PROCESSING APPARATUS TO PROVIDE A TECHNIQUE FOR SPECIFYING A PHYSICAL PRINTER ASSOCIATED WITH A LOGICAL PRINTER, AND NON-TRANSITORY STORAGE MEDIUM

BACKGROUND OF THE INVENTION

Field of the Invention

The present invention relates to a printing apparatus, a system, and a storage medium.

Description of the Related Art

Cloud print services that use a cloud have been proposed. Each cloud print service provides a logical printer, and a print job submitted to the logical printer is executed by a physical printer associated with the logical printer. Printing that uses a logical printer may be called "cloud printer", and printing that does not use a logical printer may be called "local printing". Japanese Patent Laid-Open No. 2022-40993 proposes a technique for a fallback to local printing when cloud printing cannot be performed. Specifically, an information processing apparatus obtains a device ID of a physical printer from both a cloud print service and the physical printer. By comparing the device IDs obtained through two paths, the information processing apparatus specifies the physical printer associated with the logical printer. The device ID obtained from the physical printer is text data, which may be fabricated or tampered. When the device ID cannot be properly obtained from the physical printer, a physical device associated with the logical printer cannot be properly specified. As a result, there are cases where printing is performed by a printing apparatus that is not intended by the user.

SUMMARY OF THE INVENTION

Some aspects of the present disclosure provide a technique for safely specifying a physical printer associated with a logical printer. According to some embodiments, a printing apparatus comprising: a first receiving unit configured to receive a first print job from a print server; a second receiving unit configured to receive a second print job from an information processing apparatus within a local area network; a print unit configured to perform printing that is based on the first print job and printing that is based on the second print job; a storage unit configured to store a private key and a digital certificate; and a transmission unit configured to transmit the digital certificate to the information processing apparatus within the local area network, wherein the digital certificate includes a public key paired with the private key, and an electronic signature created by the print server is provided.

Further features of the present invention will become apparent from the following description of exemplary embodiments with reference to the attached drawings.

DESCRIPTION OF THE EMBODIMENTS

Figure 1:
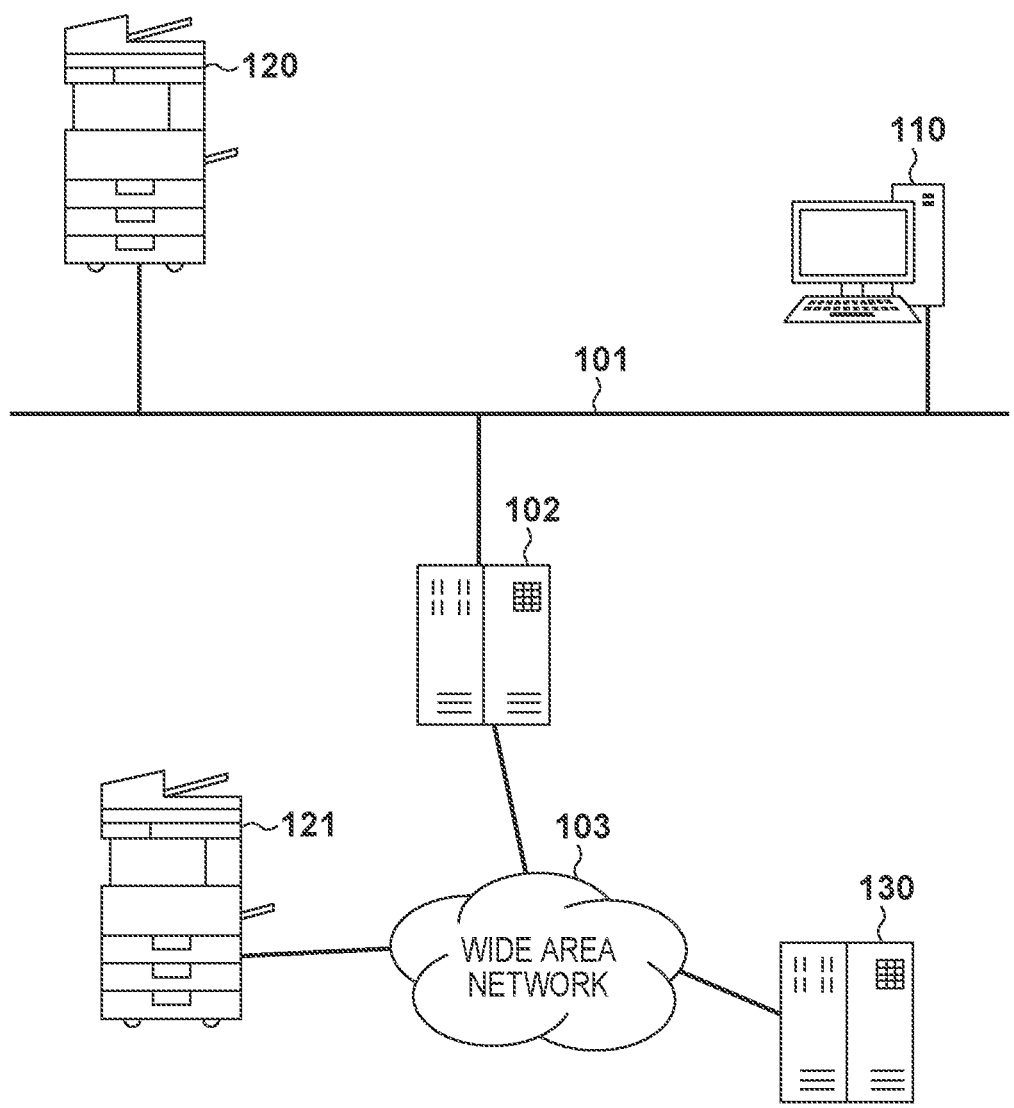
FIG. 1 is a schematic diagram describing an exemplary configuration of a print system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Exemplary Configuration of Print System

An exemplary configuration of a print system according to a first embodiment will be described with reference to FIG. 1. The print system includes an information processing apparatus 110, printing apparatuses 120 and 121, and a print server 130, for example. The number of constituent elements of the print system is not limited to the example in FIG. 1. In addition, the print system may include a constituent element that is not shown in FIG. 1.

The information processing apparatus 110 and the printing apparatus 120 are connected to the same local area network (LAN) 101. The LAN 101 may be a wired LAN or a wireless LAN, or may be a combination thereof. The LAN 101 is connected to a wide area network 103 (for example, the Internet) via a firewall 102. The printing apparatus 121 and the print server 130 are also connected to the wide area network 103. The information processing apparatus 110 and the printing apparatus 120 can communicate with each other within the LAN 101 (that is to say, without using the wide area network 103). In addition, the information processing apparatus 110 and the printing apparatus 120 can communicate with the print server 130 through the LAN 101, the firewall 102, and the wide area network 103. The printing apparatus 121 may be connected to the wide area network 103 through a LAN or a cellular network (for example, a network that complies with the fourth-generation communication standard (4G) or the fifth-generation communication standard (5G)). The information processing apparatus 110 may also be connected to the wide area network 103 through a cellular network.

The printing apparatuses 120 and 121 have a print function of performing printing based on a print job. The printing apparatuses 120 and 121 may have at least one of a scanner function or a facsimile function in addition to the print function. A printing apparatus that has a plurality of functions in this manner may also be referred to as a multifunction printer (MFP). Alternatively, the printing apparatuses 120 and 121 may be dedicated machines (SFPs: Single Function Peripherals) that have the print function only. Printing may be printing that is performed onto a sheet-like recording medium such as paper, or may be formation of a three-dimensional object (so-called three-dimensional printing).

The print server 130 provides a print service for transmitting a print job to any printing apparatus (for example, the printing apparatus 120), in accordance with a print job generated by the information processing apparatus 110. The print server 130 provides a logical printer to the information processing apparatus 110, and accepts a print job for the logical printer, for example. The logical printer is a virtual printing apparatus (for example, a printer object) provided by the print server 130. The logical printer can also be referred to as a "cloud printer". The information processing apparatus 110 can also generate a print queue for the logical printer in a similar manner to the printing apparatuses 120 and 121. Compared with the logical printer, a physical printing apparatus such as the printing apparatus 120 or 121 can also be referred to as a "physical printer". The physical printer can also be referred to as a "local printer" when connected to the same LAN connected to an information processing apparatus that submits a print job. In the following description, the logical printer and the physical printers are simply referred to as "printers" in a collective manner.

The print server 130 may be a server in an on-premise environment connected to the wide area network 103, or may be a server in a cloud computing environment (hereinafter, simply referred to as a "cloud"). A print service that is provided by the print server 130 in the cloud may also be referred to as a cloud print service (hereinafter, referred to as a "CPS"). Universal Print (registered trademark) provided by Microsoft (registered trademark) corporation is an example of the cloud print service. In the following description, a case will be described in which the print server 130 is in a cloud. However, the following description also applies to a case where the print server 130 is in an on-premise environment.

The information processing apparatus 110 provides a print function to the user of the information processing apparatus 110. The information processing apparatus 110 may designate a physical printer (for example, the printing apparatus 120) connected to the sane LAN 101, as an output destination, or may designate a logical printer provided by the print server 130, as an output destination. When the logical printer is designated as an output destination, a physical printer (for example, the printing apparatus 120) associated with the logical printer performs printing. The information processing apparatus 110 that uses CPS may also be referred to as a "client" or a "client terminal". Printing that is performed by submitting a print job to the logical printer can also be referred to as "cloud printing". Printing that is performed through cloud printing may be executed by the printing apparatus 120 connected to the same LAN 101 to which the information processing apparatus 110 is connected, or may also be executed by the printing apparatus 121 that is not connected to the LAN 101. Printing that is performed by directly (that is to say, within the LAN) submitting a print job to a physical printer can be referred to as "local print".

Exemplary Hardware Configuration of Computer

Figure 2:
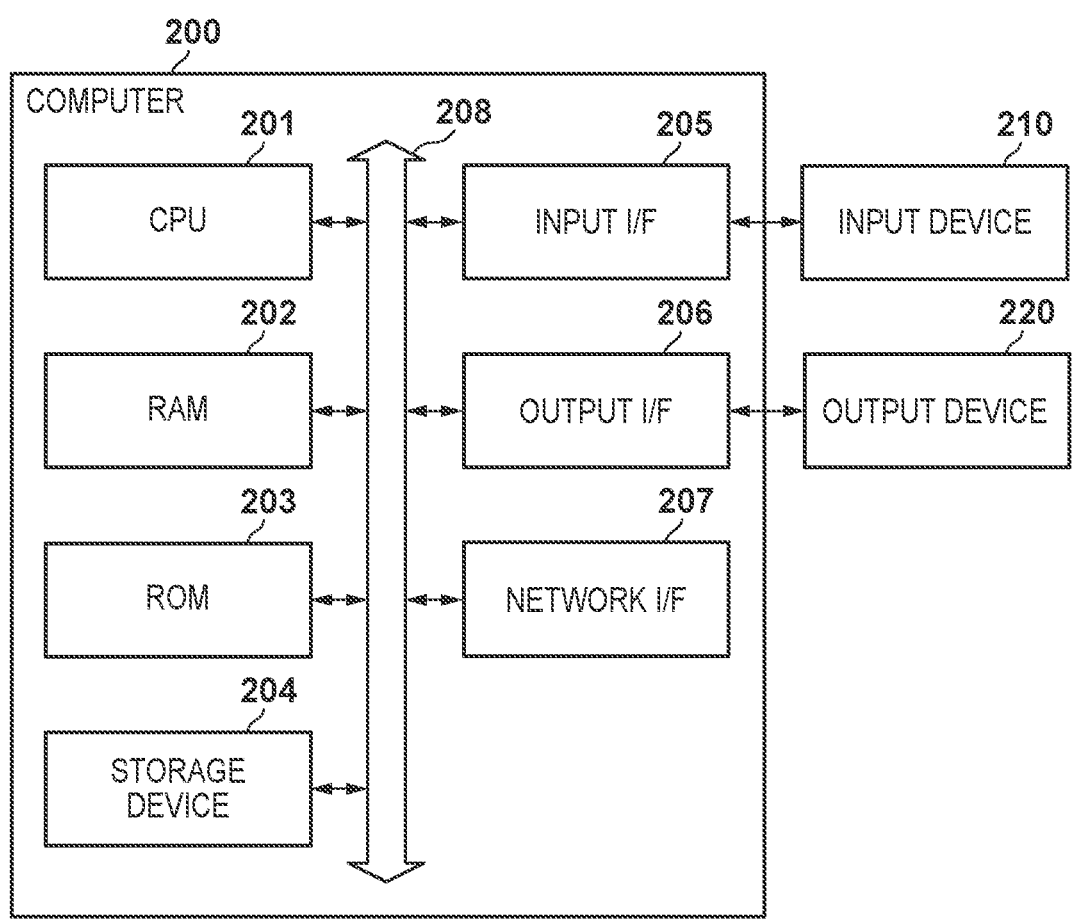
FIG. 2 is a block diagram describing an exemplary hardware configuration of a computer according to the first embodiment.

An exemplary hardware configuration of the computer 200 according to the present embodiment will be described with reference to FIG. 2. The computer 200 may be used as the information processing apparatus 110, or may be used as the print server 130. The computer 200 may include the constituent elements shown in FIG. 2.

A central processing unit (CPU) 201 is a general-purpose processing circuit for controlling overall operations of the computer 200. A random access memory (RAM) 202 is a volatile memory circuit, and is used as a temporary storage region such as a work area for processing that is performed by the CPU 201. A read-only memory (ROM) 203 is a non-volatile memory circuit, and stores programs and data that are used for processing that is performed by the CPU 201. A storage device 204 is a non-volatile storage device, and stores programs and data that are used for processing that is performed by the CPU 201. The storage device 204 may be a hard disk drive (HDD) or a solid state drive (SSD), for example. The storage device 204 may also be referred to as a "secondary storage unit". Operations that are performed by the computer 200 may be realized by the CPU 201 executing programs loaded from the storage device 204 to the RAM 202.

An input interface (UF) 205 is an OF for transmitting/receiving signals to/from an input device 210. The input device 210 is a device for obtaining input from the user of the computer 200. The input device 210 may be a keyboard, a touch panel, a microphone, a mouse, or any combination thereof, for example. An output OF 206 is an OF for transmitting/receiving signals to/from an output device 220. The output device 220 is a device for providing information to the user of the computer 200. The output device 220 may be a display, a speaker, or any combination thereof, for example. A network I/F 207 is an I/F for communicating with an external apparatus of the computer 200. The CPU 201, the RAM 202, the ROM 203, the storage device 204, the input I/F 205, the output I/F 206, and the network I/F 207 are connected to a system bus 208. In the example in FIG. 2, the input device 210 and the output device 220 are illustrated as devices different from the computer 200. Alternatively, the computer 200 may include the input device 210 and the output device 220.

Exemplary Functional Configuration of Print Server

Figure 3:
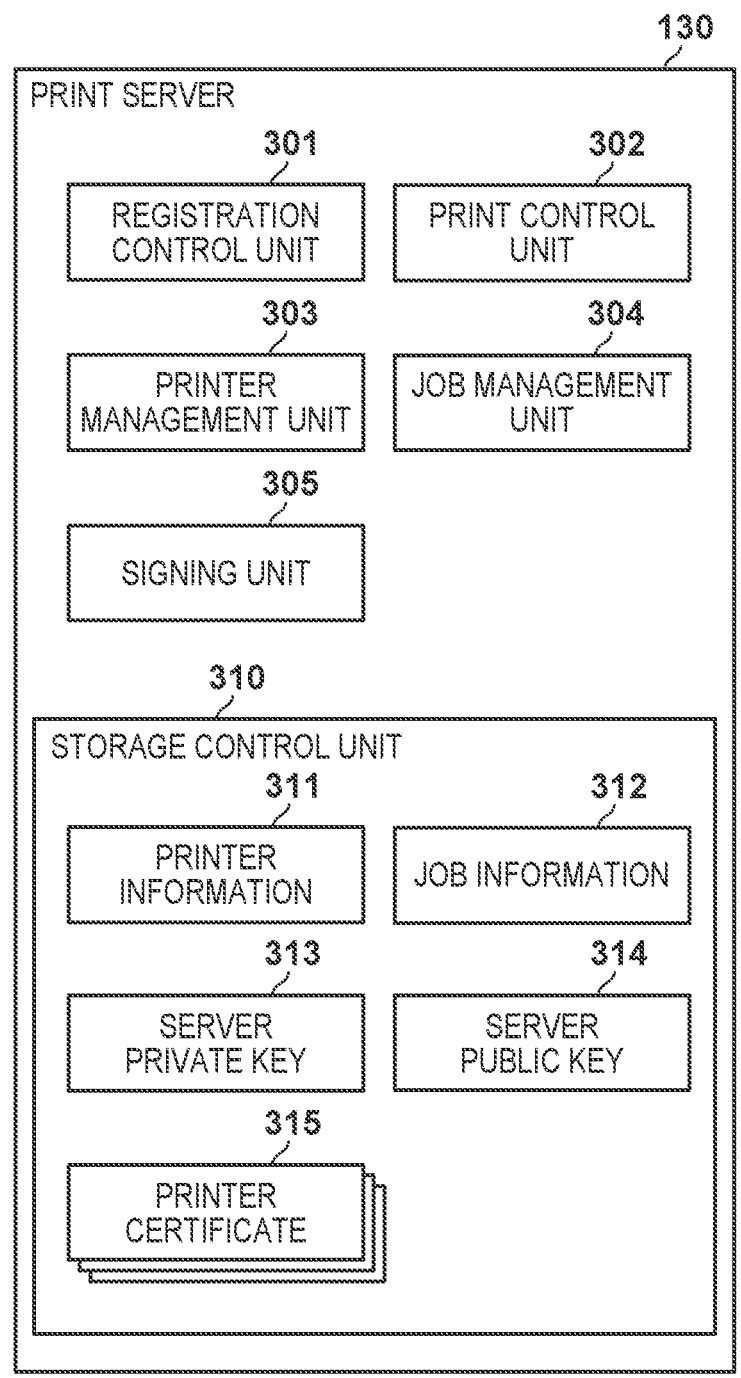
FIG. 3 is a block diagram describing an exemplary functional configuration of a print server according to the first embodiment.

An exemplary functional configuration of the print server 130 will be described with reference to FIG. 3. The print server 130 may include the functional units shown in FIG. 3. The print server 130 may include a functional unit that is not shown in FIG. 3. The functional units in FIG. 3 may be realized by the CPU 201 executing programs loaded to the RAM 202. Alternatively, some or all of the functional units in FIG. 3 may be realized by a dedicated processing circuit such as an application specific integrated circuit (ASIC).

A registration control unit 301 performs processing for registering a logical printer. The registration control unit 301 generates a logical printer associated with a physical printer in accordance with a registration start request from a printing apparatus, and registers the generated logical printer in printer information 311, for example. The logical printer registered in the printer information 311 is recognized as a printer by the information processing apparatus 110. The physical printer associated with the logical printer may be a physical printer that performs printing in accordance with a print job submitted to the logical printer. The logical printer may be associated with only one physical printer. The physical printer may be associated with only one logical printer, or may be associated with a plurality of logical printers.

A print control unit 302 performs processing related to a print job for the logical printer. The print control unit 302 receives a print job for the logical printer, from the information processing apparatus 110, and based on this, transmits the print job to the physical printer associated with the logical printer, for example. In addition, the print control unit 302 may control an event related to the print job. An event related to a print job may include receiving a print job, for example. In response to an event request received from the physical printer, the print control unit 302 may return an event related to the physical printer.

A printer management unit 303 manages information related to the logical printer registered in the print server 130, as the printer information 311. The printer information 311 includes capability information of the physical printer associated with the logical printer, a cloud printer ID uniquely allocated to the logical printer, information regarding a print queue in which a print job is spooled, information regarding a digital certificate associated with the logical printer, and the like. The digital certificate associated with the logical printer may be a digital certificate of a physical printer associated with the logical printer. The digital certificate of the physical printer may be a digital certificate for a private and public key pair used by the physical printer. Hereinafter, a digital certificate associated with a logical printer may be simply referred to as a "digital certificate of a logical printer".

A job management unit 304 manages information regarding a print job received from the information processing apparatus 110, as job information 312. The job information 312 includes information regarding a print job and the state of the print job, print data included in the print job, and the like.

A signing unit 305 adds an electronic signature to a public key of a physical printer using a server private key 313, thereby generating a printer certificate 315. The server private key 313 is a private key that is used by the print server 130. The printer certificate 315 is a digital certificate that includes a public key paired with a private key that is used by the physical printer and the electronic signature created by the print server 130 using the server private key 313.

A storage control unit 310 stores information to the RAM 202 or the storage device 204, and reads out information from the RAM 202 or the storage device 204, in accordance with an instruction from another functional unit. According to the present embodiment, the storage control unit 310 stores the printer information 311, the job information 312, the server private key 313, a server public key 314, and the printer certificate 315. The server public key 314 is a public key paired with the server private key 313. The storage control unit 310 may store the printer certificate 315 for each of a plurality of logical printers registered in the print server 130.

Exemplary Functional Configuration of Information Processing Apparatus

Figure 4:
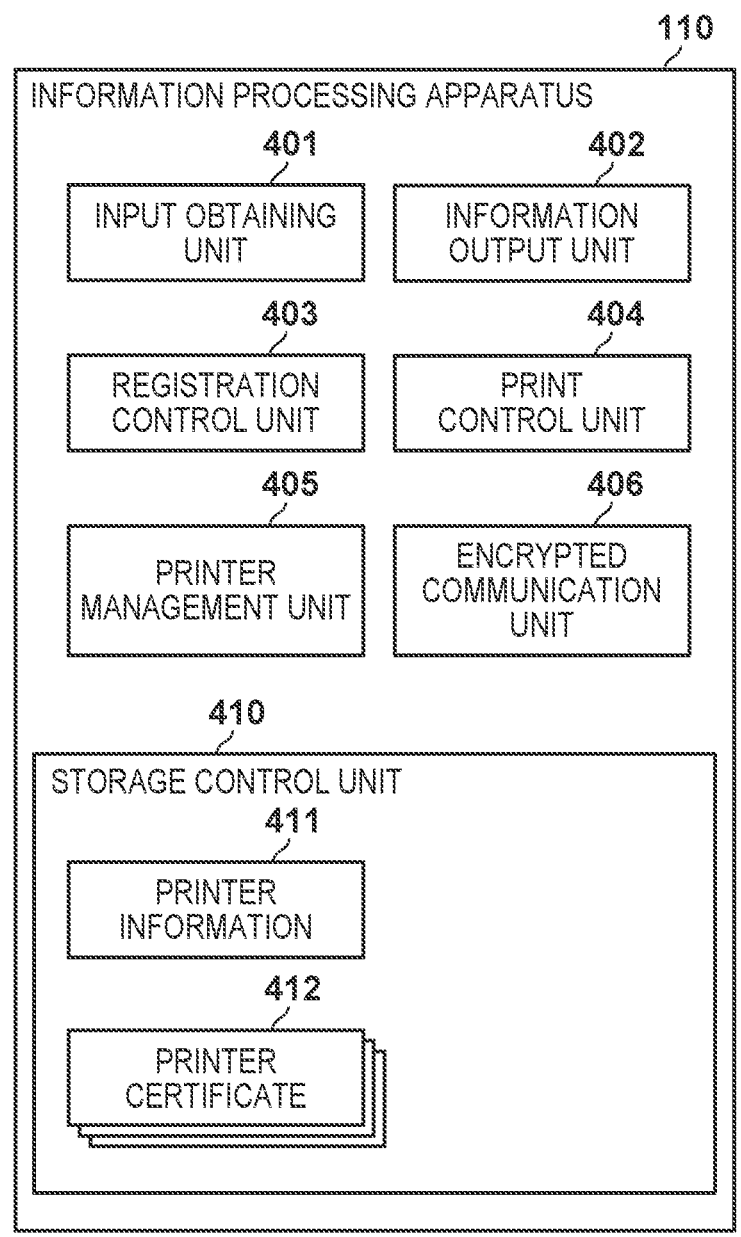
FIG. 4 is a block diagram describing an exemplary functional configuration of an information processing apparatus according to the first embodiment.

An exemplary functional configuration of the information processing apparatus 110 will be described with reference to FIG. 4. The information processing apparatus 110 may include the functional units shown in FIG. 4. The information processing apparatus 110 may include a functional unit that is not shown in FIG. 4. The functional units in FIG. 4 may be realized by the CPU 201 executing programs loaded to the RAM 202. Alternatively, some or all of the functional units in FIG. 4 may be realized by a dedicated processing circuit such as an ASIC.

An input obtaining unit 401 obtains input from the user of the information processing apparatus 110 using the input OF 205. An information output unit 402 outputs information to the user of the information processing apparatus 110 using the output OF 206.

A registration control unit 403 performs processing for registering a logical printer to the print server 130. A print control unit 404 performs processing related to printing that is performed by a printer. The print control unit 404 may transmit a print job to the logical printer registered in the print server 130, in accordance with a print instruction from the user of the information processing apparatus 110, for example. The print control unit 404 may transmit a print job directly (that is to say, in the same LAN) to a physical printer in accordance with a print instruction from the user of the information processing apparatus 110.

A printer management unit 405 manages information regarding a printer to which the information processing apparatus 110 can submit a print job, as printer information 411. The printer information 411 includes capability information of the printer, information regarding a digital certificate of the printer, and the like. An encrypted communication unit 406 performs processing for encrypted communication with another apparatus (for example, the printing apparatus 120).

A storage control unit 410 stores information to the RAM 202 or the storage device 204 and reads out information from the RAM 202 or the storage device 204 in accordance with an instruction from another functional unit. According to the present embodiment, the storage control unit 410 stores the printer information 411 and a printer certificate 412. The printer certificate 412 is a digital certificate that includes a public key of the physical printer, and an electronic signature created by the print server 130 using the server private key 313.

Exemplary Hardware Configuration of Printing Apparatus

Figure 5:
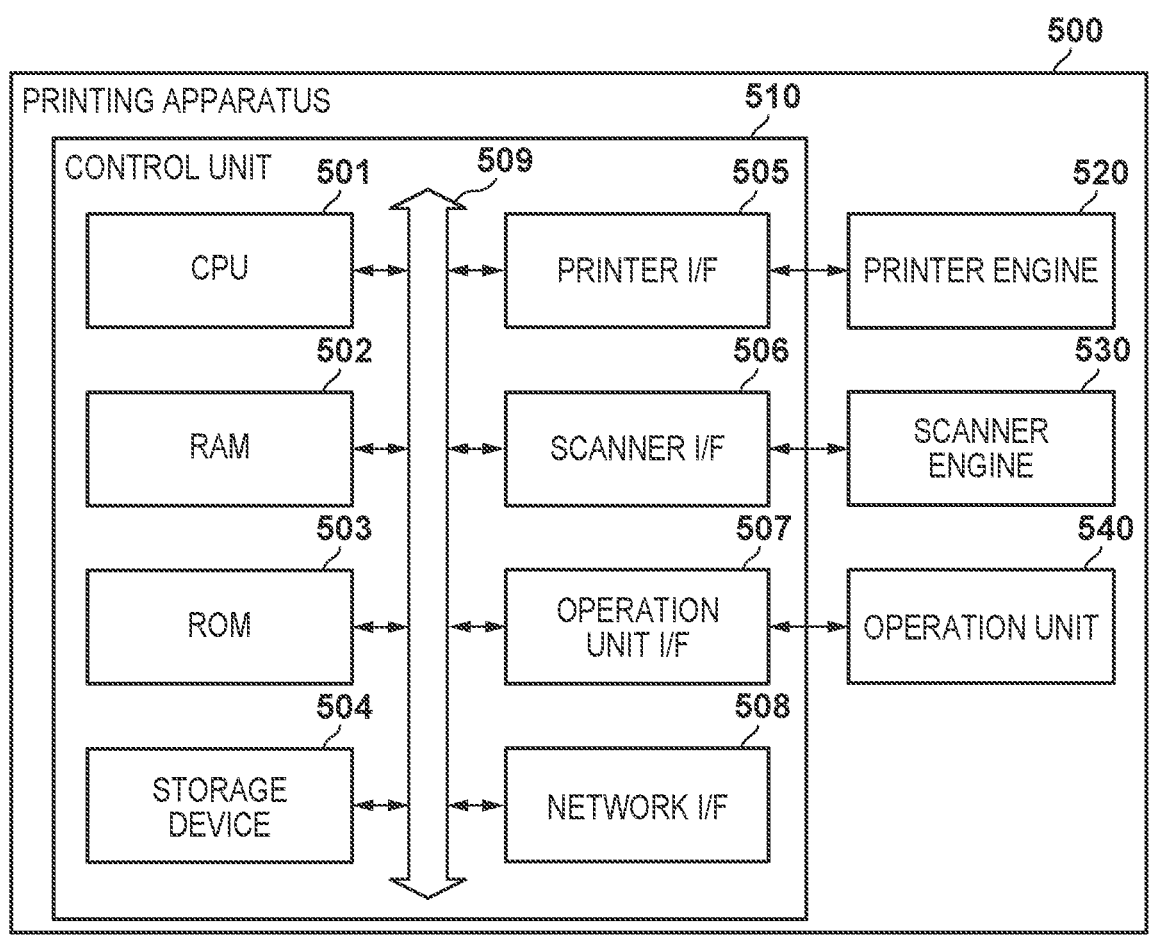
FIG. 5 is a block diagram describing an exemplary hardware configuration of a printing apparatus according to the first embodiment.

An exemplary hardware configuration of a printing apparatus 500 according to the present embodiment will be described with reference to FIG. 5. The printing apparatus 500 may be used as the printing apparatus 120, or may be used as the printing apparatus 121. The printing apparatus 500 may include the constituent elements shown in FIG. 5. The printing apparatus 500 is a physical printing apparatus, and thus is also referred to as a "physical printer".

A CPU 501 is a general-purpose processing circuit for controlling overall operations of the printing apparatus 500.

A RAM 502 is a volatile memory circuit, and is used as a temporary storage region such as a work area for processing that is performed by the CPU 501. A ROM 503 is a non-volatile memory circuit, and stores programs and data used for processing that is performed by the CPU 501. A storage device 504 is a non-volatile storage unit, and stores programs and data that are used for processing that is performed by the CPU 501 (for example, a print job, image data, and setting information). The storage device 504 may be an HDD or an SSD, for example. The storage device 504 may also referred to as a "secondary storage unit". Operations that are performed by the printing apparatus 500 may be realized by the CPU 501 executing programs loaded from the storage device 504 to the RAM 502.

A printer OF 505 is an OF for transmitting/receiving signals to/from a printer engine 520. The printer engine 520 performs printing based on a signal (for example, image signals or a print command) supplied from a control unit 510 through the printer OF 505. Printing may be electrophotographic printing in which toner is transferred onto paper and is fixed, may be inkjet printing that is performed by discharging ink to paper, or may be three-dimensional printing.

A scanner I/F 506 is an OF for transmitting/receiving signals to/from a scanner engine 530. The scanner engine 530 supplies signals (for example, image signals) obtained by reading a document, to the control unit 510 via the scanner I/F 506. The CPU 501 may process the image signals supplied from the scanner engine 530, and supply record image signals obtained as a result of the processing, to the printer engine 520. In addition, the CPU 501 may generate image data based on the image signals supplied from the scanner engine 530, and transmit the generated image data to an external apparatus.

An operation unit OF 507 is an OF for transmitting/receiving signals to/from an operation unit 540. The operation unit 540 is a device that obtains input from the user of the printing apparatus 500, and provides information to the user of the printing apparatus 500. The operation unit 540 may be a display panel (for example, a liquid crystal display), a speaker, a touch panel, a keyboard, buttons, or a touch screen, or may be constituted by any combination thereof, for example.

A network I/F 508 is an OF for communicating with an external apparatus of the printing apparatus 500. The control unit 510 is constituted by the CPU 501, the RAM 502, the ROM 503, the storage device 504, the printer OF 505, the scanner I/F 506, the operation unit OF 507, and the network I/F 508. The constituent elements included in the control unit 510 are connected to a system bus 509.

Exemplary Configuration of Operation Unit of Printing Apparatus.

Figure 6:
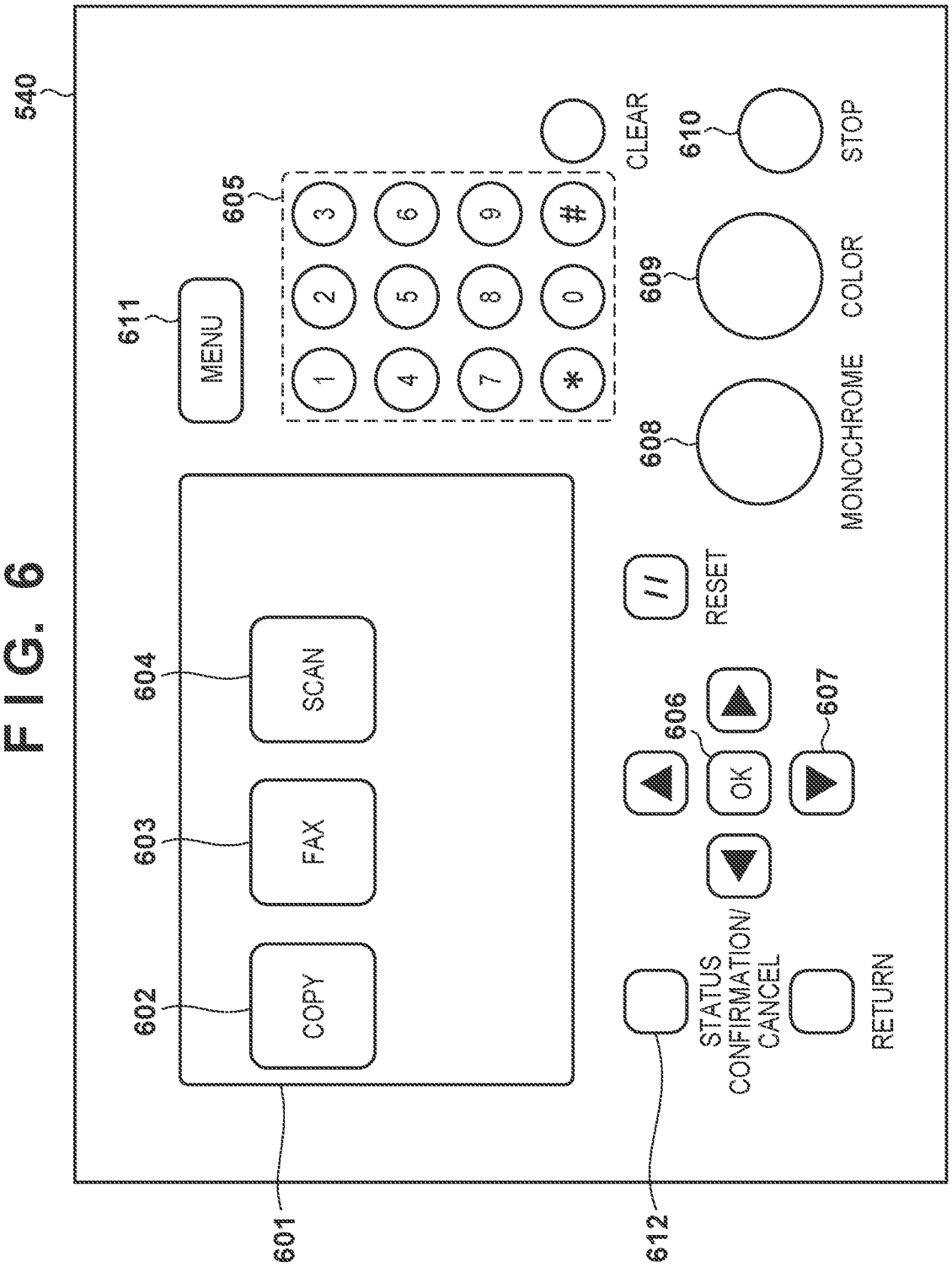
FIG. 6 is a schematic diagram describing an exemplary configuration of an operation unit of the printing apparatus according to the first embodiment.

An exemplary configuration of the operation unit 540 of the printing apparatus 500 will be described with reference to FIG. 6. In the example in FIG. 6, the operation unit 540 is configured as an operation panel made in the form of a panel. The operation unit 540 may include the constituent elements shown in FIG. 6. The operation unit 540 may also include a constituent element that is not shown in FIG. 6.

A display panel 601 is a touch screen obtained by integrally forming a touch panel for obtaining input from the user and a display (for example, a liquid crystal display) for displaying information to the user. In the example in FIG. 6, buttons 602 to 604 are displayed on the display panel 601. The button 602 is a software button for obtaining, from the user, an instruction to make a switch to a copy mode. The printing apparatus 500 displays a copy operation screen on the display panel 601 in accordance with the user touching the button 602. The button 603 is a software button for obtaining, from the user, an instruction to make a switch to a facsimile mode. The printing apparatus 500 displays a facsimile operation screen on the display panel 601 in accordance with the user touching the button 603. The button 604 is a software button for obtaining, from the user, an instruction to make a switch to a scanner mode. The printing apparatus 500 displays a scanner operation screen on the display panel 601 in accordance with the user touching the button 604. In addition, a dialogue for interaction with the user, and a job list of cloud printing may be displayed on the display panel 601.

A numeric keypad 605 is a group of physical buttons for obtaining, from the user, input of a number or the like. A button 606 is a physical button for obtaining, from the user, an instruction to determine display content on the display panel 601, or the like. Direction keys 607 are physical buttons for obtaining, from the user, an instruction to select an item from a menu displayed on the display panel 601, or the like. A button 608 is a physical button for obtaining an instruction for monochrome copy, from the user. A button 609 is a physical button for obtaining an instruction for color copy, from the user. A button 610 is a physical button for obtaining, from the user, an instruction to stop processing. A button 611 is a physical button for obtaining, from the user, an instruction to display a menu screen for performing settings of the printing apparatus 500 and the like. A button 612 is a physical button for obtaining, from the user, an instruction to display the state of the printing apparatus 500, such as a list of print jobs that the printing apparatus 500 has received.

Exemplary Functional Configuration of Printing Apparatus

Figure 7:
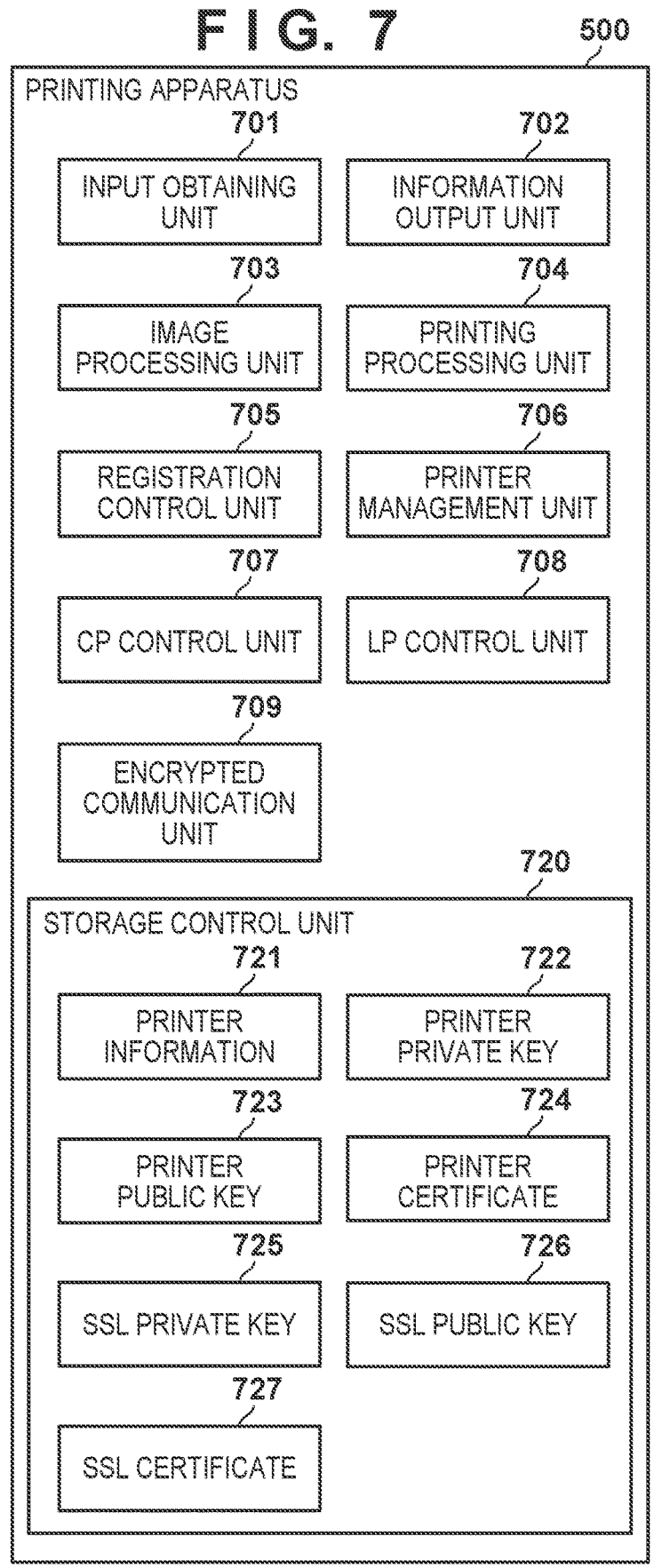
FIG. 7 is a block diagram describing an exemplary functional configuration of the printing apparatus according to the first embodiment.

An exemplary functional configuration of the printing apparatus 500 will be described with reference to FIG. 7. The printing apparatus 500 may include the functional units shown in FIG. 7. The printing apparatus 500 may include a functional unit that is not shown in FIG. 7. The functional units in FIG. 7 may be realized by the CPU 501 executing programs loaded to the RAM 502. Alternatively, some or all of the functional units in FIG. 7 may also be realized by a dedicated processing circuit such as an ASIC.

An input obtaining unit 701 obtains input from the user of the printing apparatus 500 using the operation unit OF 507. An information output unit 702 outputs information to the user of the printing apparatus 500 using the operation unit OF 507. An image processing unit 703 renders a print job to produce printing image data. A printing processing unit 704 prints the image data obtained by the image processing unit 703 rendering the print job.

A registration control unit 705 performs processing for registering a logical printer associated with the printing apparatus 500 to the print server 130. A printer management unit 706 manages information regarding the printing apparatus 500 as printer information 721. The printer information 721 may include, for example, the state of the printing apparatus 500, the capability of the printing apparatus 500, and a cloud printer ID uniquely allocated by the print server 130 to the logical printer associated with the printing apparatus 500. In addition, the printer information 721 may include local printer IDs for the information processing apparatus 110 to identify printing apparatuses within the same LAN 101.

A cloud print (CP) control unit 707 performs processing related to cloud printing. The CP control unit 707 may transfer print data received from the print server 130, to the image processing unit 703, for example. In addition, the CP control unit 707 may transmit an event request to the print server 130.

A local print (LP) control unit 708 performs processing related to local printing. The LP control unit 708 may respond to a printer search performed by the information processing apparatus 110, for example. In addition, the LP control unit 708 may transfer print data received directly from the information processing apparatus 110, to the image processing unit 703.

An encrypted communication unit 709 performs processing for encrypted communication with another apparatus (for example, the information processing apparatus 110). The encrypted communication unit 709 may generate a private and public key pair that is used in a public key encryption method, for example. Furthermore, the encrypted communication unit 709 may establish a Secure Sockets Layer (SSL) session with another apparatus. SSL may include Transport Layer Security (TLS).

A storage control unit 720 stores information to the RAM 502 or the storage device 504 and reads out information from the RAM 502 or the storage device 504 in accordance with an instruction from another functional unit. According to the present embodiment, the storage control unit 720 stores printer information 721, a printer private key 722, a printer public key 723, a printer certificate 724, an SSL private key 725, an SSL public key 726, and an SSL certificate 727. The printer private key 722 is a private key that is used by the printing apparatus 500. The printer public key 723 is a public key that is paired with the printer private key 722. The printer certificate 724 is a digital certificate that includes the printer public key 723 and an electronic signature created by the print server 130 using the server private key 313. The SSL private key 725 is a private key that is used in order to establish an SSL session. In the SSL public key 726 is a public key that is paired with the SSL private key 725. The SSL certificate 727 is a digital certificate that includes the SSL public key 726 and an electronic signature created by a certificate authority. The certificate authority may be the print server 130, or may be another certificate authority. The SSL private and SSL public key pair, namely the SSL private key 725 and the SSL public key 726 may be generated by the printing apparatus 500, or may be generated by an external apparatus and be installed in the printing apparatus 500.

Overall Processing Sequence of Cloud Printing

Figure 8:
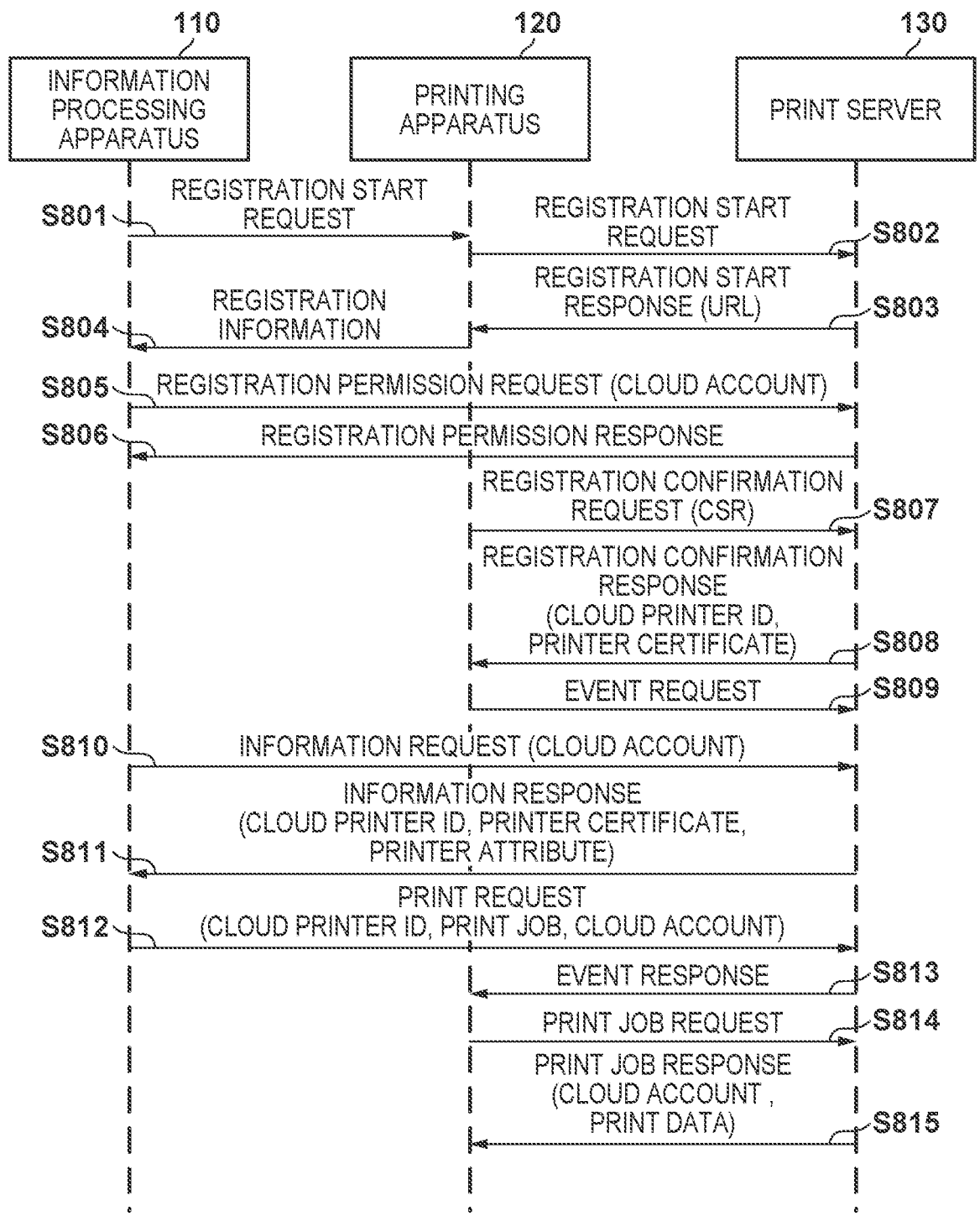
FIG. 8 is a sequence diagram describing overall processing of cloud printing according to the first embodiment.

A sequence of overall processing for performing cloud printing will be described with reference to FIG. 8. The example in FIG. 8 illustrates a case where the information processing apparatus 110 registers the printing apparatus 120 to the print server 130, and submits a print job to a logical printer associated with the printing apparatus 120. Registering the printing apparatus 120 to the print server 130 may be registering a logical printer associated with the printing apparatus 120 to the print server 130. Assume that, in the following example, the printing apparatus 120 supports a Web User Interface (UI) function for operating the printing apparatus 120 through the information processing apparatus 110. In addition, assume that the information processing apparatus 110 supports a Web UI client function. Mutual communication between the information processing apparatus 110, the printing apparatus 120, and the print server 130 may be performed using an Internet Printing Protocol (IPP).

In step S801, the registration control unit 403 of the information processing apparatus 110 transmits a registration start request to the printing apparatus 120 in accordance with an instruction from the user of the information processing apparatus 110. The registration start request may be a request to start processing for registering the printing apparatus 120 to the print server 130. The registration start request may be transmitted using the Web UI client function of the information processing apparatus 110.

In step S802, the registration control unit 705 of the printing apparatus 120 transmits a registration start request to the print server 130 in accordance with the registration start request being received from the information processing apparatus 110. The registration start request may be a request to start processing for registering the printing apparatus 120 to the print server 130.

In step S803, the registration control unit 301 of the print server 130 transmits a registration start response to the printing apparatus 120 in accordance with the registration start request being received from the printing apparatus 120. The registration start response includes a uniform resource locator (URL) of a Web page for inputting information for the user of the information processing apparatus 110 to register the printing apparatus 120 to the print server 130.

In step S804, the registration control unit 705 of the printing apparatus 120 transmits registration information to the information processing apparatus 110 in accordance with the registration start response being received from the print server 130. The registration information includes the URL included in the registration start response. The information output unit 402 of the information processing apparatus 110 displays the Web page to the user in accordance with the registration information being received from the printing apparatus 120.

In step S805, the registration control unit 403 of the information processing apparatus 110 transmits a registration permission request to the print server 130 in accordance with the user of the information processing apparatus 110 accessing the URL and inputting information required for registration. The registration permission request includes a cloud account of the user of the information processing apparatus 110. The cloud account is an account for the user to use a tenant in the cloud that includes the print server 130.

In step S806, the registration control unit 301 of the print server 130 checks whether or not the cloud account included in the registration permission request belongs to a user that has authority to register the printing apparatus 120 to the print server 130. If the cloud account belongs to a user that has the authority, the registration control unit 301 of the print server 130 transmits a registration permission response to the information processing apparatus 110. The registration permission response may be a message for performing notification of a result of checking whether or not the user of the information processing apparatus 110 is a user that has the authorization to register the printing apparatus 120.

In step S807, the printer management unit 706 of the printing apparatus 120 transmits a registration confirmation request to the print server 130 in accordance with the registration start response being received from the print server 130. The registration confirmation request is a request related to registration of the printing apparatus 120 to the print server 130, and, specifically, the registration confirmation request may be a request to register the printing apparatus 120 to the print server 130. The registration confirmation request includes a certificate signing request (CSR). The CSR is a message for requesting the print server 130 to electronically sign the printer public key 723. The CSR includes the printer public key 723, an electronic signature created using the printer private key 722, and other information that is used for filing an application. A printer private and printer public key pair, namely the printer private key 722 and the printer public key 723 may be generated in this step, or may be generated in advance (for example, before the processing in FIG. 8 is started).

In step S808, the printer management unit 303 of the print server 130 generates a new logical printer in accordance with the registration confirmation request being received from the printing apparatus 120, associates the logical printer with the printing apparatus 120, and adds the logical printer to the printer information 311. Accordingly, the printing apparatus 120 is registered to the print server 130, and the information processing apparatus 110 can perform cloud printing that uses the logical printer. In addition, the printer management unit 303 of the print server 130 allocates a unique cloud printer ID to the generated logical printer, and adds this cloud printer ID to the printer information 311 in association with the logical printer. Furthermore, the signing unit 305 of the print server 130 creates the printer certificate 315 by electronically signing the printer public key 723 included in the CSR, and adds the printer certificate 315 to the printer information 311 in association with the logical printer. The cloud printer ID and the printer public key 723 added to the printer information 311 are stored in the storage control unit 310 of the print server 130. The registration control unit 301 of the print server 130 then transmits a registration confirmation response to the printing apparatus 120. The registration confirmation response includes the cloud printer ID of the printing apparatus 120, and the printer certificate 315.

In step S809, the CP control unit 707 of the printing apparatus 120 transmits an event request to the print server 130 in accordance with the registration confirmation response being received from the print server 130. The event request may be a request to notify the printing apparatus 120 that an event related to the printing apparatus 120 has occurred, when it occurred. The event request may be a request related to an event of a print job being submitted to the logical printer associated with the printing apparatus 120.

In step S810, the printer management unit 405 of the information processing apparatus 110 transmits an information request to the print server 130 in accordance with an instruction from the user of the information processing apparatus 110. The information request may be a request to obtain information regarding a logical printer that can be used by the user of the information processing apparatus 110. The information request includes a cloud account of the user of the information processing apparatus 110.

In step S811, the printer management unit 303 of the print server 130 transmits an information response to the information processing apparatus 110 in accordance with the information request being received from the information processing apparatus 110. The information response includes the cloud printer ID, the printer certificate 315, and a printer attribute for each of one or more logical printers that the user of the information processing apparatus 110 can use. The printer certificate 315 is a digital certificate associated with a logical printer. The printer management unit 405 of the information processing apparatus 110 updates the printer information 411 based on the information response. The storage control unit 410 of the information processing apparatus 110 stores the received printer certificate 315 as the printer certificate 412.

In step S812, the printer management unit 405 of the information processing apparatus 110 transmits a print request to the print server 130 in accordance with an instruction from the user of the information processing apparatus 110. The print request includes a cloud printer ID, information regarding a print job, and the cloud account of the user of the information processing apparatus 110. The information regarding the print job includes print data and print setting. The print request may be a request requesting that the print data included in the print request be printed by a logical printer that has the cloud printer ID included in the print request.

In step S813, the print control unit 302 of the print server 130 transmits an event response to the printing apparatus 120 associated with the logical printer, in accordance with the print request being received from the information processing apparatus 110. The event response is a response to the event request received in step S809. The event response is a response for performing notification that an event of a type specified by the event request has occurred.

In step S814, the CP control unit 707 of the printing apparatus 120 transmits a print job request to the print server 130 in accordance with the event response being received from the print server 130. The print job request may be a request to obtain a print job that is to be executed by the printing apparatus 120.

In step S815, the print control unit 302 of the print server 130 transmits a print job response to the printing apparatus 120 in accordance with the print job request being received from the printing apparatus 120. The print job response includes the cloud account and the print job. The printing apparatus 120 then performs printing based on the print job in accordance with the print job response being received from the print server 130. The print job response received by the printing apparatus 120 from the print server 130 may be the Fetch-Job Response of IPP.

In the description given with reference to FIG. 8, registration of the printing apparatus 120 in steps S801 to S806 and cloud printing in steps S810 to S815 may be performed by the same user, or may be performed by different users. In addition, in step S807, the printing apparatus 120 adds the CSR to the registration confirmation request, but may transmit the CSR separately from the registration confirmation request. The printing apparatus 120 may add the CSR to a message other than the registration confirmation request, or may transmit the CSR independently, for example. In step S808, the print server 130 adds the printer certificate to the registration confirmation response, but may transmit the printer certificate separately from the registration confirmation response. The print server 130 may add the printer certificate to a message other than the registration confirmation response, or may transmit the printer certificate independently, for example.

Figure 9:
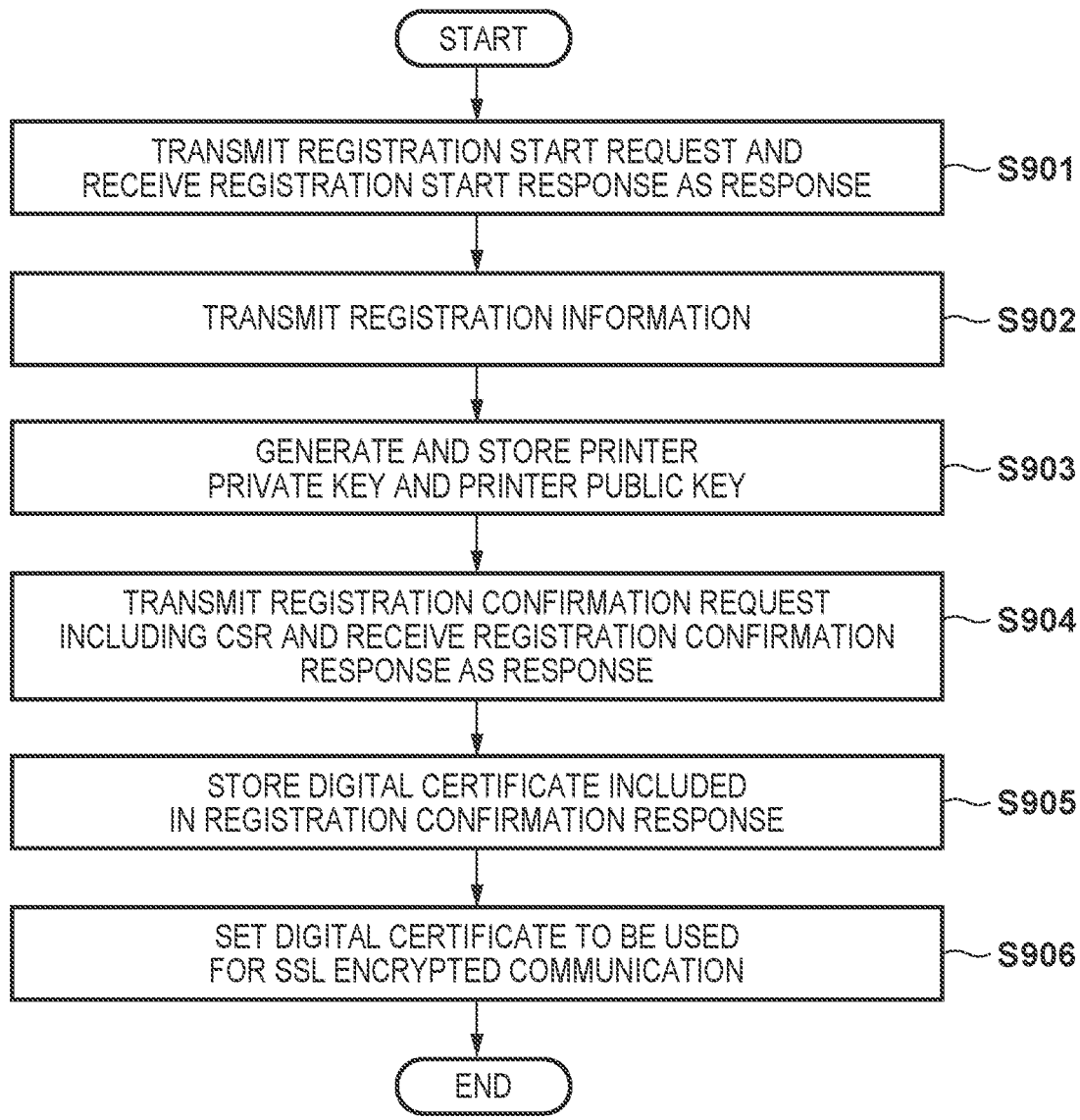
FIG. 9 is a flowchart describing exemplary registration processing that is performed by the printing apparatus according to the first embodiment.

Operation Flow of Registration Processing that is Performed by Printing Apparatus An exemplary operation for registering the printing apparatus 500 to the print server 130, which is performed by the printing apparatus 500, will be described in detail with reference to FIG. 9. The following operation corresponds to step S801 to step S808 in FIG. 8. The operation in FIG. 9 may be started in accordance with the registration start request (step S801 in FIG. 8) being received from the information processing apparatus 110. The printing apparatus 500 may be the printing apparatus 120, may be the printing apparatus 121, or may be another printing apparatus.

In step S901, the registration control unit 705 of the printing apparatus 500 transmit a registration start request to the print server 130 (step S802 in FIG. 8), and receives a registration start response from the print server 130 as a response to the registration start request (step S803 in FIG.

8). As described above, the registration start response includes a URL for the user of the information processing apparatus 110 to perform processing for registering the printing apparatus 500.

In step S902, the registration control unit 705 of the printing apparatus 500 transmits registration information to the information processing apparatus 110 (step S804 in FIG. 8). As described above, the registration information includes the URL included in the registration start response received in step S901. In step S903, the encrypted communication unit 709 of the printing apparatus 500 generates a printer private and printer public key pair, namely the printer private key 722 and the printer public key 723, which are stored in the storage control unit 720.

In step S904, the registration control unit 705 of the printing apparatus 500 transmits a registration confirmation request that includes a CSR, to the print server 130 (step S807 in FIG. 8), and receives a registration confirmation response as a response to the registration confirmation request (step S808 in FIG. 8). The CSR includes the printer public key 723, an electronic signature created using the printer private key 722, and other information that is used for filing an application. The registration confirmation response includes a cloud account ID and a digital certificate. This digital certificate includes the printer public key 723, and an electronic signature created by the print server 130.

In step S905, the storage control unit 720 of the printing apparatus 500 stores the digital certificate included in the registration confirmation response, as the printer certificate 724. The printer certificate 724 is stored in association with the printer private key 722 and the printer public key 723.

In step S906, the encrypted communication unit 709 of the printing apparatus 500 sets the printer certificate 724 as a digital certificate that is used for future SSL encrypted communication. Accordingly, after step S906, the encrypted communication unit 709 establishes an encrypted communication path using the printer certificate 724. Specifically, in handshake processing for establishing an SSL encrypted communication path, the printer certificate 724 is transmitted from the printing apparatus 500 to a communication partner. Before step S906 is executed, the SSL certificate 727 may be set as a digital certificate that is used for SSL encrypted communication. The printer certificate 724 may be deleted from the printing apparatus 500 when a registration of the printing apparatus 500 in the print server 130 is canceled. In this case, the SSL certificate 727 may be set as a digital certificate that is used for SSL encrypted communication. When the SSL certificate 727 is set as a digital certificate that is used for SSL encrypted communication, the encrypted communication unit 709 establishes an encrypted communication path using the SSL certificate 727.

Overall Processing Sequence of Local Printing

Figure 10:
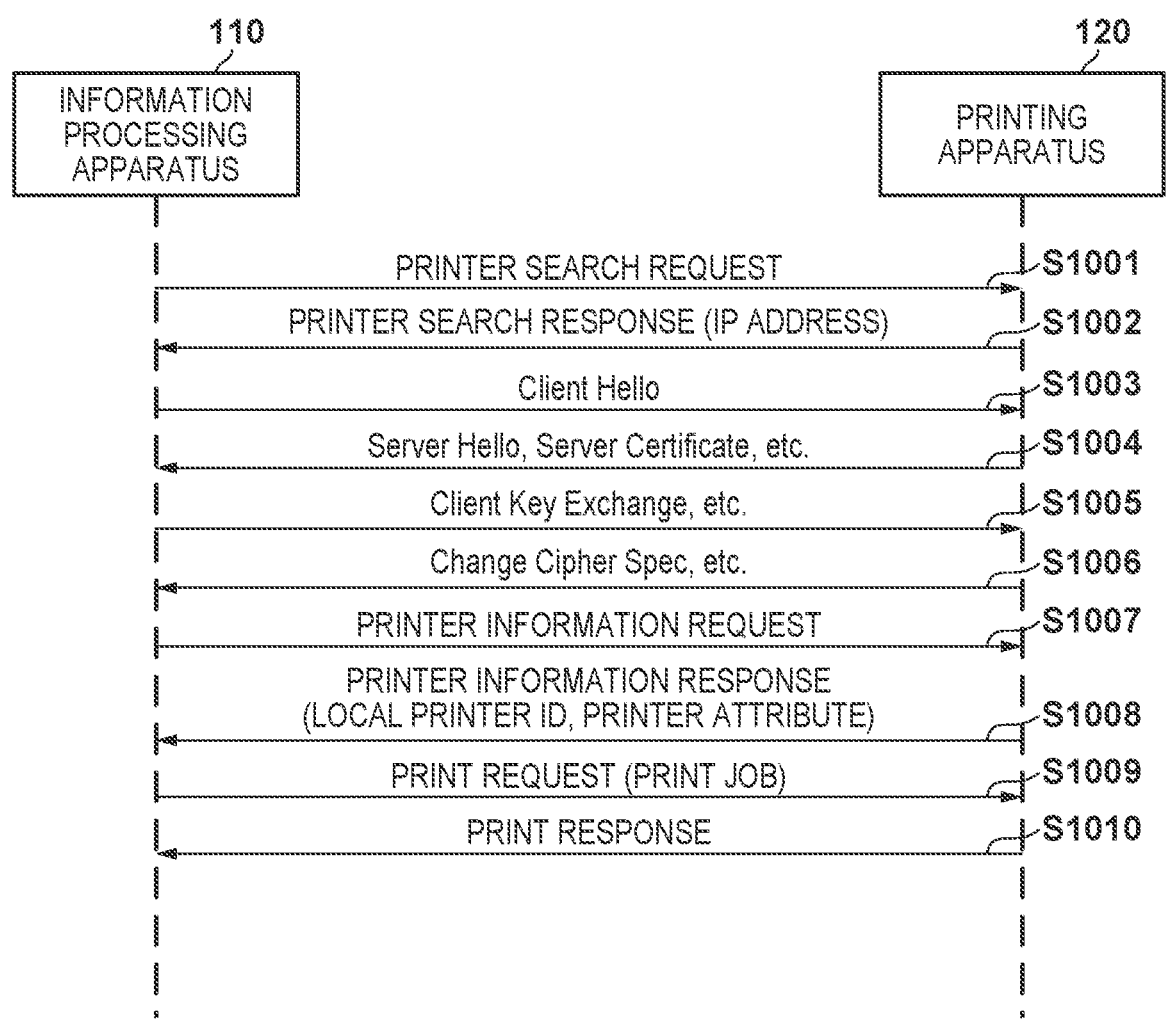
FIG. 10 is a sequence diagram describing overall processing of local printing according to the first embodiment.

A sequence of overall processing for performing local printing will be described with reference to FIG. 10. Assume that the printing apparatus 120 has completed the operation in FIG. 9 before the operation in FIG. 10 is started. Mutual communication between the information processing apparatus 110 and the printing apparatus 120 may be performed using the IPP. In addition, mutual communication between the information processing apparatus 110 and the printing apparatus 120 is performed within the LAN 101. For this reason, even when the LAN 101 cannot access the broadband network 103, the processing in FIG. 10 can be executed.

In step S1001, the registration control unit 403 of the information processing apparatus 110 transmits a printer search request to an apparatus connected to the LAN 101, for example, in accordance with an instruction from the user. The printer search request is a message requesting the printing apparatus connected within the LAN 101 to respond. In step S1002, the LP control unit 708 of the printing apparatus 120 connected to the LAN 101 transmits a printer search response to the information processing apparatus 110, in response to the printer search request. The printer search response includes an Internet protocol (IP) address of the printing apparatus 120. The information processing apparatus 110 can find a printing apparatus within the LAN 101 by receiving a printer search response. When a plurality of printing apparatuses transmit printer search responses to the information processing apparatus 110 in step S1002, the subsequent steps S1003 to S1008 may be executed for each of the plurality of printing apparatuses.

In steps S1003 to S1006, handshake processing for establishing an SSL encrypted communication path is performed. In step S1003, the encrypted communication unit 406 of the information processing apparatus 110 transmits a Client Hello message to the printing apparatus 120. In step S1004, the encrypted communication unit 709 of the printing apparatus 120 transmits a Server Hello message, a Server Certificate message, and the like to the information processing apparatus 110 in accordance with the Client Hello message being received. The Server Certificate message includes the printer certificate 724 stored in the storage control unit 720.

In step S1005, the encrypted communication unit 406 of the information processing apparatus 110 transmits a Client Key Exchange message and the like to the printing apparatus 120 in accordance with completion of transmission of the messages from the printing apparatus 120. The Client Key Exchange message includes a common key generated by the information processing apparatus 110. In step S1006, the encrypted communication unit 709 of the printing apparatus 120 transmits a Change Cipher Spec message and the like to the information processing apparatus 110, in accordance with completion of transmission of the message from the information processing apparatus 110. The common key is shared between the information processing apparatus 110 and the printing apparatus 120 in accordance with completion of transmission of the message from the printing apparatus 120. Data that is transmitted/received between the information processing apparatus 110 and the printing apparatus 120 after step S1006 is encrypted using this common key.

In step S1007, the registration control unit 403 of the information processing apparatus 110 transmits a printer information request to the printing apparatus 120 in accordance with establishment of the encrypted communication path. The printer information request is a message for obtaining information regarding the printing apparatus 120. In step S1008, the LP control unit 708 of the printing apparatus 120 transmits a printer information response to the information processing apparatus 110, in accordance with the printer information request being received from the information processing apparatus 110. The printer information response includes a local printer ID of the printing apparatus 120 and a printer attribute of the printing apparatus 120. The local printer ID is identification information allocated to the printing apparatus 120 by an administrator of the printing apparatus 120, for example.

In step S1009, the print control unit 404 of the information processing apparatus 110 transmits a print request to the printing apparatus 120, for example, in accordance with an instruction from the user. The print request may include a print job that includes print data and print settings. The print request may be the Print-Job Request of IPP. In step S1010, the LP control unit 708 of the printing apparatus 120 performs printing based on the print job in accordance with the print request being received from the information processing apparatus 110, and transmits a print response that includes a result of printing, to the information processing apparatus 110.

Flow of Registration of Local Printer to Information Processing Apparatus

An exemplary operation for registering the printing apparatus 120 as a physical printer to the information processing apparatus 110, which is performed by the information processing apparatus 110, will be described in detail with reference to FIG. 11. The following operation corresponds to steps S1001 to S1008 in FIG. 10. The operation in FIG. 11 may be started in accordance with an instruction to add a local printer being received from the user of the information processing apparatus 110.

In step S1101, the registration control unit 403 of the information processing apparatus 110 transmits a printer search request to an apparatus connected to the LAN 101 (step S1001 in FIG. 10). In step S1102, the registration control unit 403 of the information processing apparatus 110 determines whether or not a printer search response has been received. If it is determined that a printer search response has been received (YES in step S1102), the registration control unit 403 of the information processing apparatus 110 advances the procedure to step S1103, and otherwise (NO in step S1102) ends the procedure. If it is determined that a printer search response has not been received, the information output unit 402 of the information processing apparatus 110 may notify the user that no printing apparatus has been found.

In step S1103, the encrypted communication unit 406 of the information processing apparatus 110 establishes an encrypted communication path between the information processing apparatus 110 and the printing apparatus 120 that has transmitted the printer search response (steps S1003 to S1006 in FIG. 10). In the operation for establishing an encrypted communication path, the encrypted communication unit 406 of the information processing apparatus 110 obtains the printer certificate 724 from the printing apparatus 120 (step S1004 in FIG. 10). As described above, the printer certificate 724 includes an electronic signature created by the print server 130.

In step S1104, the registration control unit 403 of the information processing apparatus 110 transmits a printer information request to the printing apparatus 120 through the encrypted communication path (step S1007 in FIG. 10), and receives a printer information response as a response to the printer information request (step S1008 in FIG. 10).

In step S1105, the registration control unit 403 of the information processing apparatus 110 determines whether or not the printer certificate 724 received in step S1103 matches the printer certificate 412 of at least one logical printer stored in the storage control unit 410. If it is determined that the printer certificate 724 matches the printer certificate 412 of at least one logical printer (YES in step S1105), the registration control unit 403 of the information processing apparatus 110 advances the procedure to step S1106, and otherwise (NO in step S1105) advances the procedure to step S1107.

In step S1106, the printer management unit 405 of the information processing apparatus 110 registers the printing apparatus 120 to the printer information 411 in association with a logical printer whose printer certificate 412 is determined in step S1105 as matching the printer certificate 724. In step S1107, the printer management unit 405 of the information processing apparatus 110 registers the printing apparatus 120 to the printer information 411 without associating the printing apparatus 120 with any logical printer.

Printer Information of Information Processing Apparatus

Figures 12, 13:
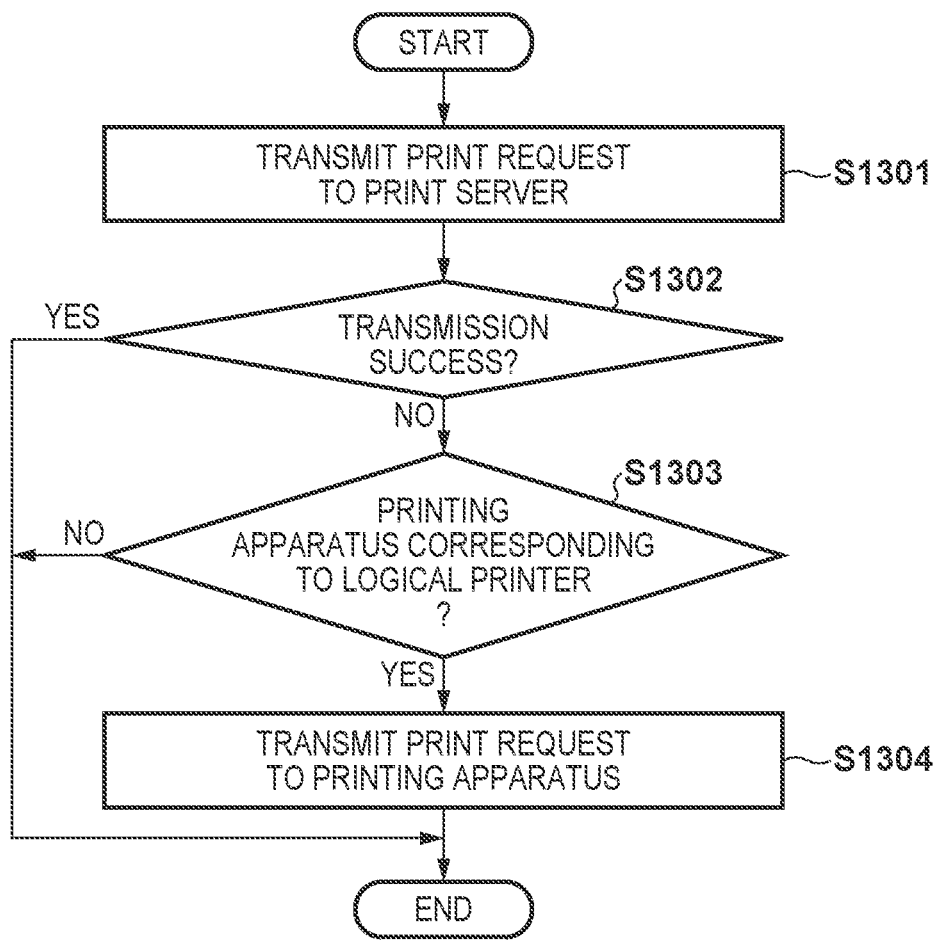
FIG. 12 is a diagram describing an example of printer information of the information processing apparatus according to the first embodiment.
FIG. 13 is a flowchart describing exemplary printing processing that is performed by the information processing apparatus according to the first embodiment.

A specific example of the printer information 411 that is managed by the information processing apparatus 110 will be described with reference to FIG. 12. In the example in FIG. 12, the printer information 411 is stored in a table format. Records in the printer information 411 respectively represent printers. As described above, each printer may be a logical printer that is provided by the print server 130, or may be a physical printer. When a logical printer and a physical printer are associated with each other, information regarding these printers is managed as one record.

A column 1201 shows the names of printers. A column 1202 shows the attributes of the printers. A column 1203 shows a cloud printer ID allocated to each logical printer by the print server 130. If a printer is not a logical printer, the column 1203 for this printer is blank. A column 1204 shows digital certificates of the printers. A column 1205 shows the local printer ID of each physical printer. When no printer is registered in the information processing apparatus 110 as a physical printer, the column 1205 is blank.

The printer management unit 405 of the information processing apparatus 110 generates a new record in the printer information 411 based on the information response in accordance with the information response being received from the print server 130 in step S811 in FIG. 8. Specifically, the printer management unit 405 of the information processing apparatus 110 respectively registers the printer attribute, the cloud printer ID, and the printer certificate included in the information response, to the column 1202 to 1204 of this new record. The printer management unit 405 of the information processing apparatus 110 may register a name that is based on the printer attribute, to the column 1201 of this record, or may register a name that is based on an instruction from the user. In the example in FIG. 12, records 1211 and 1213 represent information regarding logical printers.

Figure 11:
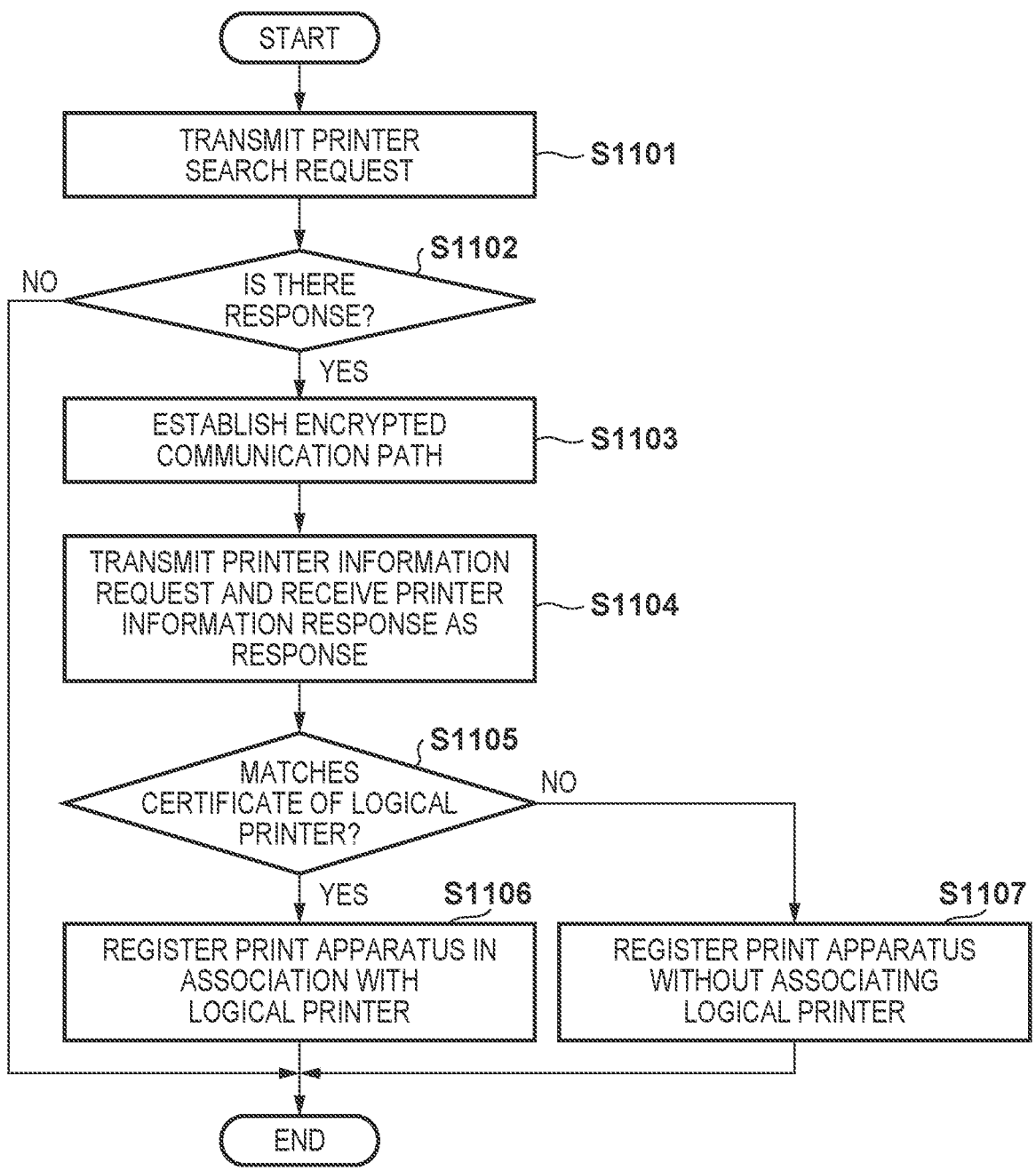
FIG. 11 is a flowchart describing exemplary processing for registering a physical printer, which is performed by the information processing apparatus according to the first embodiment.

In step S1105 in FIG. 11, the printer management unit 405 of the information processing apparatus 110 determines whether or not the printer certificate obtained from the printing apparatus 120 matches any of the digital certificates in the column 1204 of the printer information 411. Assume that, for example, the printer certificate obtained from the printing apparatus 120 matches the digital certificate of the record 1213. In this case, the printer management unit 405 of the information processing apparatus 110 registers the local printer ID of the printing apparatus 120 obtained in step S1104, to the column 1205 of the record 1213. Accordingly, the printer represented by the record 1213 is registered as both a logical printer and a physical printer. Alternatively, assume that the printer certificate obtained from the printing apparatus 120 does not match the digital certificate of any record. In this case, the printer management unit 405 of the information processing apparatus 110 generates a new record (for example, a record 1212), and respectively registers the printer attribute and the local printer ID obtained in step S1104 to the column 1202 and 1205 of this new record. In addition, the printer management unit 405 of the information processing apparatus 110 registers the printer certificate obtained in step S1103, to the column 1204 of this record. Furthermore, the printer management unit 405 of the information processing apparatus 110 may register a name that is based on the printer attribute to the column 1201 of this record, or may register a name that is based on an instruction from the user.

In the printer information 411 generated as described above, the record 1211 represents information regarding a printer that supports cloud printing only. The record 1212 represents information regarding a printer that supports local printing only. The record 1213 represents information regarding a printer that supports both cloud printing and local printing.

Printing Flow of Information Processing Apparatus

An exemplary operation in which the information processing apparatus 110 executes cloud printing will be described in detail with reference to FIG. 13. The operation in FIG. 13 may be started in accordance with an instruction for cloud printing being received from the user of the information processing apparatus 110. The instruction from the user specifies a logical printer that is to execute cloud printing.

In step S1301, the print control unit 404 of the information processing apparatus 110 transmits a print request for a logical printer that has a cloud printer ID specified by the user, to the print server 130 (step S812 in FIG. 8). In step S1302, the print control unit 404 of the information processing apparatus 110 determines whether or not the print request is successfully transmitted. If it is determined that the print request is successfully transmitted (YES in step S1302), the print control unit 404 of the information processing apparatus 110 ends the procedure, and otherwise (NO in step S1302) advances the procedure to step S1303. If it is determined that the print request is successfully transmitted, cloud printing is executed as is. Transmission of the print request may fail when it is not possible to access the print server 130, for example, when a CPS provided by the print server 130 has stopped, or due to a network fault of the broadband network 103.

When a print job cannot be submitted to the logical printer, the print control unit 404 of the information processing apparatus 110 determines in step S1303 whether or not a physical printer associated with the logical printer specified by the user is registered in the printer information 411. If it is determined that such a physical printer is registered (YES in step S1303), the print control unit 404 of the information processing apparatus 110 advances the procedure to step S1303, and otherwise (NO in step S1303) ends the procedure. When ending the procedure, the information output unit 402 of the information processing apparatus 110 may notify the user that printing has failed.

In step S1304, the print control unit 404 of the information processing apparatus 110 transmits a print request to the physical printer determined as being associated with the logical printer to which the print request has been transmitted. Here, the content of the print request that is transmitted at this time may be the same as that of the print request transmitted in step S1301.

As described above, the information processing apparatus 110 determines whether or not the printing apparatus 120 is associated with the logical printer, based on a result of comparing the printer certificate 412 received from the print server 130 with the printer certificate 724 received from the printing apparatus 120. Both the printer certificate 412 and the printer certificate 724 include an electronic signature of the print server 130, and thus it is difficult to fabricate these digital certificates. For this reason, the information processing apparatus 110 can safely specify the physical printer associated with the logical printer. In addition, the printer certificate is provided from the printing apparatus 120 to the information processing apparatus 110 in processing for establishing an SSL encrypted communication path, and thus there is no need to define a particular message for providing a printer certificate.

Second Embodiment

A print system according to a second embodiment will be described with reference to FIGS. 14A and 14B. Redundant description of content that may be similar to the first embodiment is omitted. In the first embodiment, in step S906 in FIG. 9, the encrypted communication unit 709 of the printing apparatus 500 sets the printer certificate 724 as a digital certificate that is to be used for future SSL encrypted communication. In the second embodiment, the printing apparatus 500 inquires of the user of the printing apparatus 500 about a digital certificate that is to be used for SSL encrypted communication.

Figure 14A:
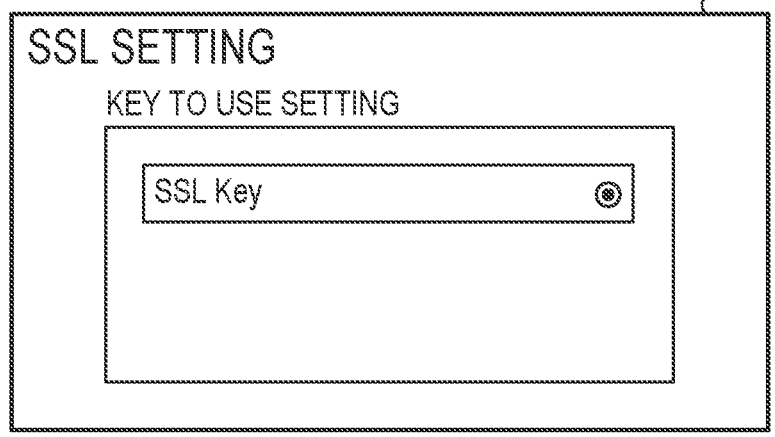
FIGS. 14A and 14B are schematic diagrams describing a screen example according to a second embodiment.

FIG. 14A shows a screen 1401 that is presented to the user by the printing apparatus 500 when a logical printer associated with the printing apparatus 500 is not registered in the print server 130. The screen 1401 is displayed, for example, before the printing apparatus 500 obtains a printer certificate from the print server 130, or when a registration of a logical printer associated with the printing apparatus 500 has been canceled. The screen 1401 may be displayed on the display panel 601. The example of the screen 1401 indicates that the SSL certificate 727 is the only digital certificate that can be used for SSL encrypted communication.

Figure 14B:
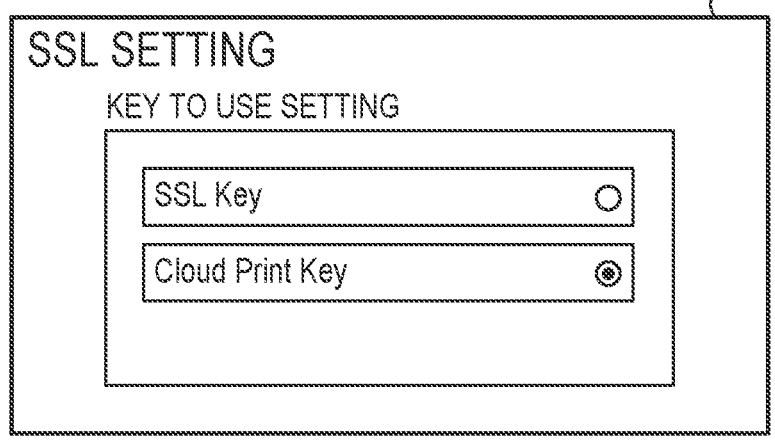

FIG. 14B shows a screen 1402 that is presented to the user by the printing apparatus 500 when a logical printer associated with the printing apparatus 500 is registered in the print server 130. The screen 1402 may be displayed on the display panel 601. The example of the screen 1402 indicates the printer certificate 724 and the SSL certificate 727 are digital certificates that can be used for SSL encrypted communication. The input obtaining unit 701 of the printing apparatus 500 obtains, from the user of the printing apparatus 500, an instruction related to whether to use the printer certificate 724 or an SSL certificate in order to establish an encrypted communication path. The encrypted communication unit 709 of the printing apparatus 500 performs SSL encrypted communication using a digital certificate specified by the user of the printing apparatus 500.

Third Embodiment

Figure 15:
FIG. 15 is a schematic diagram describing a message example according to a third embodiment.

A print system according to a third embodiment will be described with reference to FIG. 15. Redundant description of content that may be similar to the first embodiment is omitted. In the first embodiment, in step S906 in FIG. 9, the encrypted communication unit 709 of the printing apparatus 500 sets the printer certificate 724 as a digital certificate that is used for future SSL encrypted communication. However, when the printing apparatus 500 has other functions that use SSL encrypted communication, there can be cases where it is preferable that a digital certificate that is used for such functions is not changed to the printer certificate 724. Examples of such cases include a case where a key and a digital certificate generated originally by the user are installed in the printing apparatus 500, and this digital certificate is being used for SSL encrypted communication.

In the present embodiment, the encrypted communication unit 709 of the printing apparatus 500 determines a digital certificate that is used for SSL encrypted communication, based on a port number. The encrypted communication unit 709 uses a port 443 for an encrypted communication path that is established using the SSL certificate 727, and uses a port different from the port 443, such as a port 10443, for an encrypted communication path established using the printer certificate 724.

In step S1001 in FIG. 10, for example, the information processing apparatus 110 may transmit a printer search request using Multicast Domain Name System (mDNS). In step S1002, the printing apparatus 500 adds the number 10443 as a port number to a printer search response that is a response to this printer search request. The printing apparatus 500 adds an SRV record 1501 in FIG. 15 to the printer search response, for example. An SRV record of mDNS is configured for each service.

The attributes of the record 1501 include a service name (Service), a protocol that is used (Protocol), a domain name (Name), a port number (Port), and a host name of a service target (Target). In the record 1501, "ipps" indicating "IPP over SSL (IPPS)" is set as a protocol that is used. In the record 1501, the port 10443 is set as a port number.

The information processing apparatus 110 that has received this record 1501 uses the port 10443 for SSL encrypted communication with the printing apparatus 500. The printing apparatus 500 uses the printer certificate 724 for SSL encrypted communication in which the port 10443 serves as a destination, and uses the SSL certificate 727 for SSL encrypted communication in which the port 443 serves as a destination. Accordingly, the digital certificate that is used for existing SSL encrypted communication is not changed.

Fourth Embodiment

A print system according to a fourth embodiment will be described with reference to FIGS. 16A and 16B. Redundant description of content that may be similar to the first embodiment is omitted. In the above third embodiment, a switch is made between the use of digital certificates to be used for SSL encrypted communication, by using different port numbers. However, there are cases where the port 443 is also desired to be used for SSL encrypted communication that uses the printer certificate 724.

In the present embodiment, a function called "Server Name Indication (SNI)" that is a technique for one server to switch between the use of a plurality of digital certificates is used in SSL communication. In step S1001 in FIG. 10, for example, the information processing apparatus 110 transmits a printer search request using mDMS. In step S1002, the printing apparatus 500 sets "iRC3500-1.local" as a host name of the printing apparatus 500, that is to say, as a host name of a service target (Target) of the SRV record that is added to the printer search response. In step S1003, the information processing apparatus 110 transmits a Client Hello message that includes extension information.

Figure 16A:
FIGS. 16A and 16B are schematic diagrams describing a message example according to a fourth embodiment.
Figure 16B:

FIG. 16A shows an example of extension information 1601. In "Server Name" in the extension information 1601, the name of the server (the printing apparatus 500) to which the information processing apparatus 110 is about to be connected is set. The information processing apparatus 110 sets the host name obtained in step S1002 ("iRC3500-1.local") as the name of the server. In step S1003, the printing apparatus 500 transmits the printer certificate 724 when the host name is "iRC3500-1.local", and transmits the SSL certificate 727 when the host name is not "iRC3500-1.local". Accordingly, it is possible to determine a digital certificate to be used, based on the host name specified by the client at the time of establishment of an encrypted communication path, and thus the digital certificate that is used for existing SSL encrypted communication is not changed.

In the above example, the information processing apparatus 110 obtains the host name of the printing apparatus 500 from the printer search response received from the printing apparatus 500. Alternatively, the information processing apparatus 110 may obtain the host name of the printing apparatus 500 from the print server 130. The print server 130 obtains, from the printing apparatus 500, a host name that uses the printer certificate 724, for example. The host name may be included in the registration start request in step S802 in FIG. 8, may be included in the registration confirmation request in step S807, or may be included in another message. When registration to a CPS is complete, the printing apparatus 500 may transmit an update-output-device-attributes message 1602 shown in FIG. 16B in accordance with the IPP. The printing apparatus 500 may add the host name ("iRC3500-1.local") indicating that the printer certificate 724 is to be used, to a "printer-dns-name" attribute in this message. The print server 130 provides this host name to the information processing apparatus 110. The host name may be included in the information response in step S811, or may be included in another message.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096757, filed Jun. 15, 2022, which is hereby incorporated by reference herein in its entirety.

What is claimed is:

1. A printing apparatus comprising:
   a first receiving unit configured to receive a first print job from a print server;
   a second receiving unit configured to receive a second print job from an information processing apparatus within a local area network;
   a print unit configured to perform printing that is based on the first print job and printing that is based on the second print job;
   a storage unit configured to store a private key and a digital certificate; and
   a transmission unit configured to transmit the digital certificate to the information processing apparatus within the local area network,
   wherein the digital certificate includes a public key paired with the private key, and an electronic signature created by the print server.

2. The printing apparatus according to claim 1, wherein
   the first receiving unit is configured to receive the first print job from the print server using an Internet Printing Protocol (IPP), and
   the second receiving unit is configured to receive the second print job from the information processing apparatus using the IPP.

3. The printing apparatus according to claim 1, further comprising a request unit configured to transmit, to the print server, a request related to a registration of the printing apparatus to the print server, wherein
   the request includes the public key, and
   the digital certificate is included in a response to the request.

4. The printing apparatus according to claim 1, further comprising an encrypted communication unit configured to establish an encrypted communication path using the digital certificate.

5. The printing apparatus according to claim 4, wherein
   the digital certificate is a first digital certificate,
   the storage unit is configured to further store a second digital certificate, and
   the encrypted communication unit is configured to further establish an encrypted communication path using the second digital certificate.

6. The printing apparatus according to claim 5, further comprising an obtaining unit configured to obtain, from a user, an instruction related to whether to use the first digital certificate or the second digital certificate to establish an encrypted communication path.

7. The printing apparatus according to claim 5, wherein the second receiving unit is configured to receive the second print job from the information processing apparatus through an encrypted communication path established using the first digital certificate.

8. The printing apparatus according to claim 5,
   wherein the encrypted communication unit is configured to:
      use a first port number for an encrypted communication path that is established using the first digital certificate; and
      use a second port number that is different from the first port number, for an encrypted communication path that is established using the second digital certificate.

9. The printing apparatus according to claim 5, wherein the encrypted communication unit is configured to determine whether to use the first digital certificate or the second digital certificate, based on a host name obtained at a time of establishment of an encrypted communication path.

10. A non-transitory storage medium that stores a program for causing a computer to function as the units of the printing apparatus according to claim 1.

11. A system that includes a printing apparatus and an information processing apparatus, wherein
    the printing apparatus includes:
       a first receiving unit configured to receive a first print job from a print server;
       a second receiving unit configured to receive a second print job from the information processing apparatus within a local area network;
       a print unit configured to perform printing that is based on the first print job and printing that is based on the second print job;
       a storage unit configured to store a private key and a first digital certificate; and
       a transmission unit configured to transmit the first digital certificate to the information processing apparatus within the local area network,
       wherein the first digital certificate includes a public key paired with the private key and an electronic signature created by the print server, and
    the information processing apparatus includes:
       a third receiving unit configured to receive a second digital certificate associated with a logical printer that is provided by the print server;
       a fourth receiving unit configured to receive the first digital certificate from the printing apparatus; and
       a determination unit configured to determine whether or not the printing apparatus is associated with the logical printer, based on a result of comparing the first digital certificate with the second digital certificate.

* * * * *